US012621394B2

(12) United States Patent
Araki

(10) Patent No.: US 12,621,394 B2
(45) Date of Patent: May 5, 2026

(54) IMAGE PROCESSING APPARATUS WITH PRINTING AND SCANNING SECURITY, AND CONTROL METHOD FOR CONTROLLING AN IMAGE PROCESSING APPARATUS

(71) Applicant: CANON KABUSHIKI KAISHA, Tokyo (JP)

(72) Inventor: Keishi Araki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/473,852

(22) Filed: Sep. 25, 2023

(65) Prior Publication Data

US 2024/0106942 A1 Mar. 28, 2024

(30) Foreign Application Priority Data

Sep. 27, 2022 (JP) .................................. 2022-153336

(51) Int. Cl.
*H04N 1/00* (2006.01)

(52) U.S. Cl.
CPC ..... *H04N 1/00331* (2013.01); *H04N 1/00344* (2013.01); *H04N 1/0048* (2013.01)

(58) Field of Classification Search
None
See application file for complete search history.

(56) References Cited

U.S. PATENT DOCUMENTS

| | | | | | |
|---|---|---|---|---|---|
| 8,060,578 | B2 * | 11/2011 | Anegawa | .............. | G06F 21/608 |
| | | | | | 709/217 |
| 2009/0086232 | A1 * | 4/2009 | Ohira | ................. | H04N 1/00326 |
| | | | | | 358/1.9 |

| | | | | | |
|---|---|---|---|---|---|
| 2010/0046015 | A1 * | 2/2010 | Whittle | ................. | G06F 21/608 |
| | | | | | 358/1.9 |
| 2014/0320888 | A1 * | 10/2014 | Baek | ...................... | G06F 21/335 |
| | | | | | 358/1.14 |
| 2016/0094757 | A1 * | 3/2016 | Miyamoto | ......... | H04N 1/00323 |
| | | | | | 358/1.14 |
| 2020/0314250 | A1 * | 10/2020 | Kobayashi | ........... | G06V 30/412 |
| 2020/0389733 | A1 * | 12/2020 | Shah | ........................ | H04R 5/04 |
| 2021/0173598 | A1 * | 6/2021 | Nagai | ................... | G06F 3/1238 |
| 2021/0303895 | A1 * | 9/2021 | Soga | ...................... | G06V 30/12 |
| 2023/0030108 | A1 * | 2/2023 | Danguchi | ........... | B60R 21/0134 |
| 2023/0376258 | A1 * | 11/2023 | Yamazaki | ............. | G06F 3/1255 |

FOREIGN PATENT DOCUMENTS

| | | | | | |
|---|---|---|---|---|---|
| JP | 2010049520 A | * | 3/2010 | | |
| WO | WO-0051338 A1 | * | 8/2000 | ......... | H04N 1/00843 |
| WO | WO-2012045861 A1 | * | 4/2012 | ........... | G06F 21/608 |

* cited by examiner

*Primary Examiner* — Abderrahim Merouan

*Assistant Examiner* — Pawan Dhingra

(74) *Attorney, Agent, or Firm* — Canon U.S.A., Inc. IP Division

(57) ABSTRACT

An image processing apparatus includes one or more memories and one or more processors. The one or more processors and the one or more memories are configured to register a plurality of character string lists, select a character string list from the plurality of character string lists based on an attribute of a job, perform a comparison process for comparing text information extracted from the job and at least one of the character strings in the selected character string list, and control execution of the job based on a comparison result of the comparison process.

9 Claims, 11 Drawing Sheets

*500*

NOTICE

< CENSORSHIP ERROR >

PRINT DATA IS CENSORED AND DETERMINED
AS DATA THAT CANNOT BE PRINTED.

PLEASE CONFIRM CONTENT OF PRINT DATA AGAIN.

*510*

OK

*520*

NOTICE

PRINT DATA IS CENSORED, AND CHARACTER STRING
SUSPECTED AS CONFIDENTIAL INFORMATION IS DETECTED.

DO YOU EXECUTE PRINTING AS IT IS?

*522*

STOP PRINTING

*521*

EXECUTE PRINTING

BANNED WORD
REGISTRATION PROCESS: START

S601

START RUI

S602

DISPLAY BANNED WORD
REGISTRATION SCREEN

S603

RECEIVE REGISTRATION
OF BANNED WORD

S604

STORE BANNED WORD

BANNED WORD
REGISTRATION PROCESS: END

Figure 7:
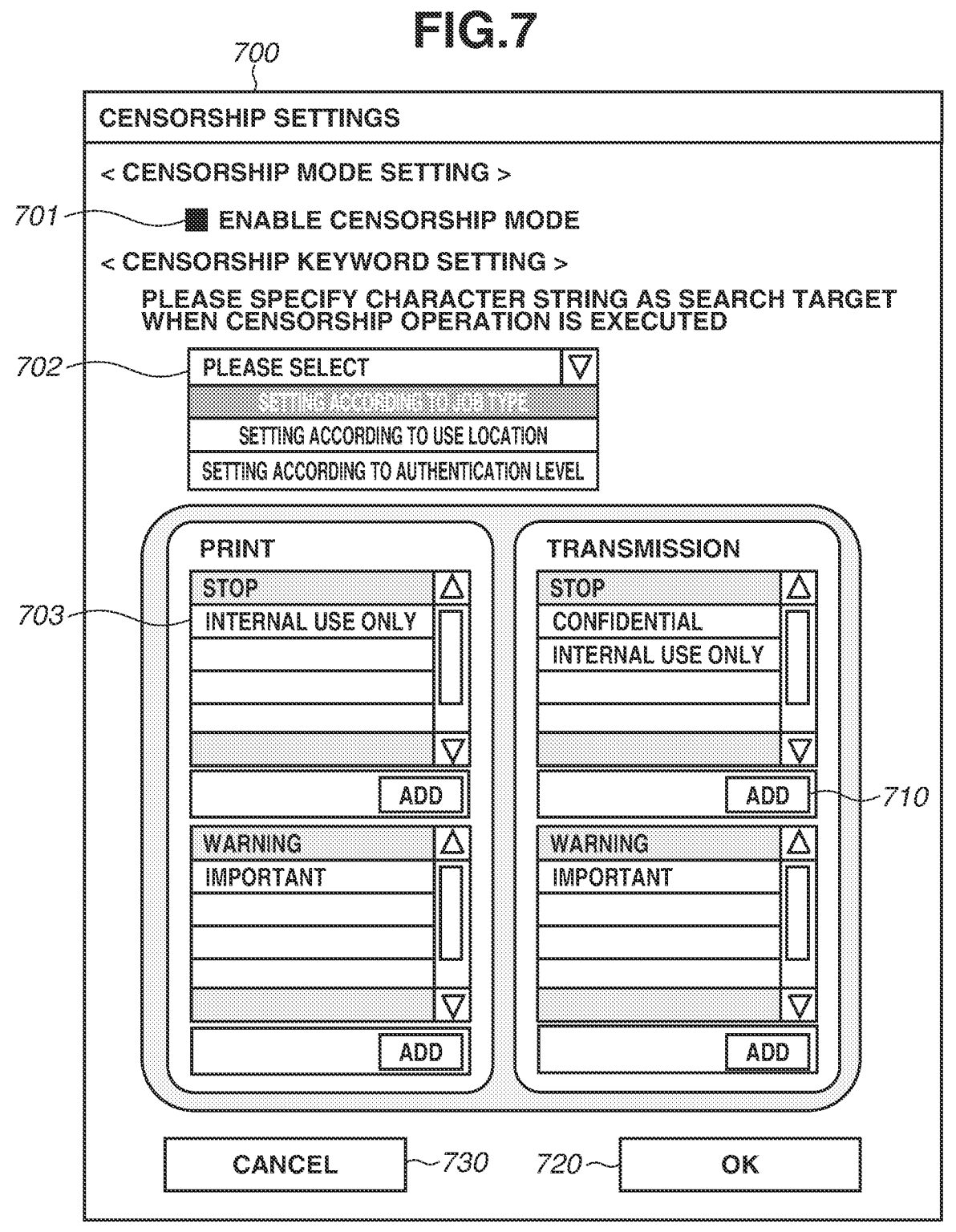

CENSORSHIP SETTINGS

< CENSORSHIP MODE SETTING >

701 — ■ ENABLE CENSORSHIP MODE

< CENSORSHIP KEYWORD SETTING >

PLEASE SPECIFY CHARACTER STRING AS SEARCH TARGET
WHEN CENSORSHIP OPERATION IS EXECUTED

702 — | PLEASE SELECT ▽ |

SETTING ACCORDING TO JOB TYPE

SETTING ACCORDING TO USE LOCATION

SETTING ACCORDING TO AUTHENTICATION LEVEL

PRINT

703 —

| STOP △ |
| INTERNAL USE ONLY |
| |
| |
| ▽ |

| ADD |

| WARNING △ |
| IMPORTANT |
| |
| |
| ▽ |

| ADD |

TRANSMISSION

| STOP △ |
| CONFIDENTIAL |
| INTERNAL USE ONLY |
| |
| ▽ |

| ADD | — 710

| WARNING △ |
| IMPORTANT |
| |
| |
| ▽ |

| ADD |

| CANCEL | ~730    720~ | OK |

FIG.9

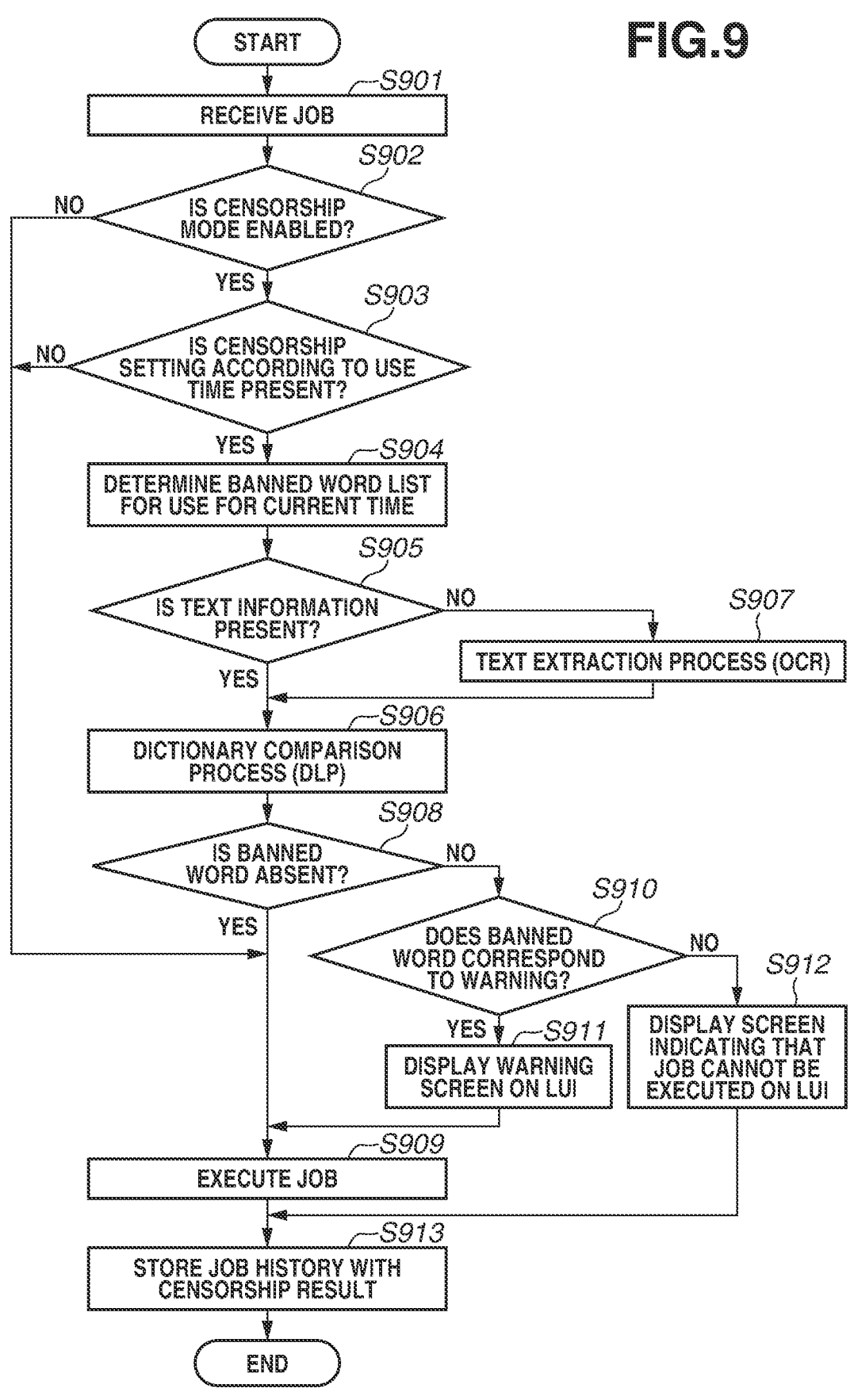

START

RECEIVE JOB ← S901

S902
IS CENSORSHIP MODE ENABLED?
NO / YES

S903
IS CENSORSHIP SETTING ACCORDING TO USE TIME PRESENT?
NO / YES

DETERMINE BANNED WORD LIST FOR USE FOR CURRENT TIME ← S904

S905
IS TEXT INFORMATION PRESENT?
NO → TEXT EXTRACTION PROCESS (OCR) ← S907
YES

DICTIONARY COMPARISON PROCESS (DLP) ← S906

S908
IS BANNED WORD ABSENT?
YES / NO

S910
DOES BANNED WORD CORRESPOND TO WARNING?
YES → DISPLAY WARNING SCREEN ON LUI ← S911
NO → DISPLAY SCREEN INDICATING THAT JOB CANNOT BE EXECUTED ON LUI ← S912

EXECUTE JOB ← S909

STORE JOB HISTORY WITH CENSORSHIP RESULT ← S913

END

IMAGE PROCESSING APPARATUS WITH PRINTING AND SCANNING SECURITY, AND CONTROL METHOD FOR CONTROLLING AN IMAGE PROCESSING APPARATUS

BACKGROUND

Field of the Disclosure

The present disclosure relates to an image processing apparatus and a control method for controlling an image processing apparatus.

Description of the Related Art

The installation locations of printing apparatuses and the environments of users of the printing apparatuses are diversified. Not only are the printing apparatuses accessed inside firewalls, but use methods in which the printing apparatuses are directly accessed from an external network, such as the Internet, increase as well. An attack on a printing apparatus by an improper operation of a malicious user and information leakage due to the loss of a printed document are issues, regardless of whether outside or inside a firewall.

As one of security measures for a printing apparatus, the censorship of the content of a print document is known.

The publication of Japanese Patent Application Laid-Open No. 2010-49520 discusses a technique for, after a print instruction is given and before printing is executed, censoring whether a banned word registered in advance is present in print data.

SUMMARY

According to an aspect of the present disclosure, an image processing apparatus according to some embodiments includes one or more memories and one or more processors. The one or more processors and the one or more memories are configured to register a plurality of character string lists including a first character string list composed of respective one or more character strings and a second character string list composed of respective one or more character strings and different in at least one character string from the first character string list, in a case where a job is received, select a character string list from the plurality of character string lists based on an attribute of the job, perform a comparison process for comparing text information extracted from the job and at least one of the character strings in the selected character string list, and control execution of the job based on a comparison result of the comparison process.

Further features of various embodiments will become apparent from the following description of exemplary embodiments with reference to the attached drawings.

BRIEF DESCRIPTION OF THE DRAWINGS

FIG. 7 is an example of a banned word setting screen.

FIG. 9 is an example of a flowchart illustrating a flow of processing of a multifunction peripheral according to a third exemplary embodiment.

DESCRIPTION OF THE EMBODIMENTS

With reference to the drawings, exemplary embodiments will be described below. In the present exemplary embodiments, a multifunction peripheral (an image processing apparatus or a digital multifunction peripheral (MFP)) having a reservation print function is used as an example. The "reservation print function" refers to, for example, a function in which a print job sent from a personal computer (PC) is not immediately output from the multifunction peripheral, and is temporarily reserved in a hard disk drive (HDD) of the multifunction peripheral or an external storage device.

However, generally, reservation printing is also used by a single-function peripheral (SFP), and therefore, the scope of application of the present disclosure is not limited to a multifunction peripheral.

Figure 1:
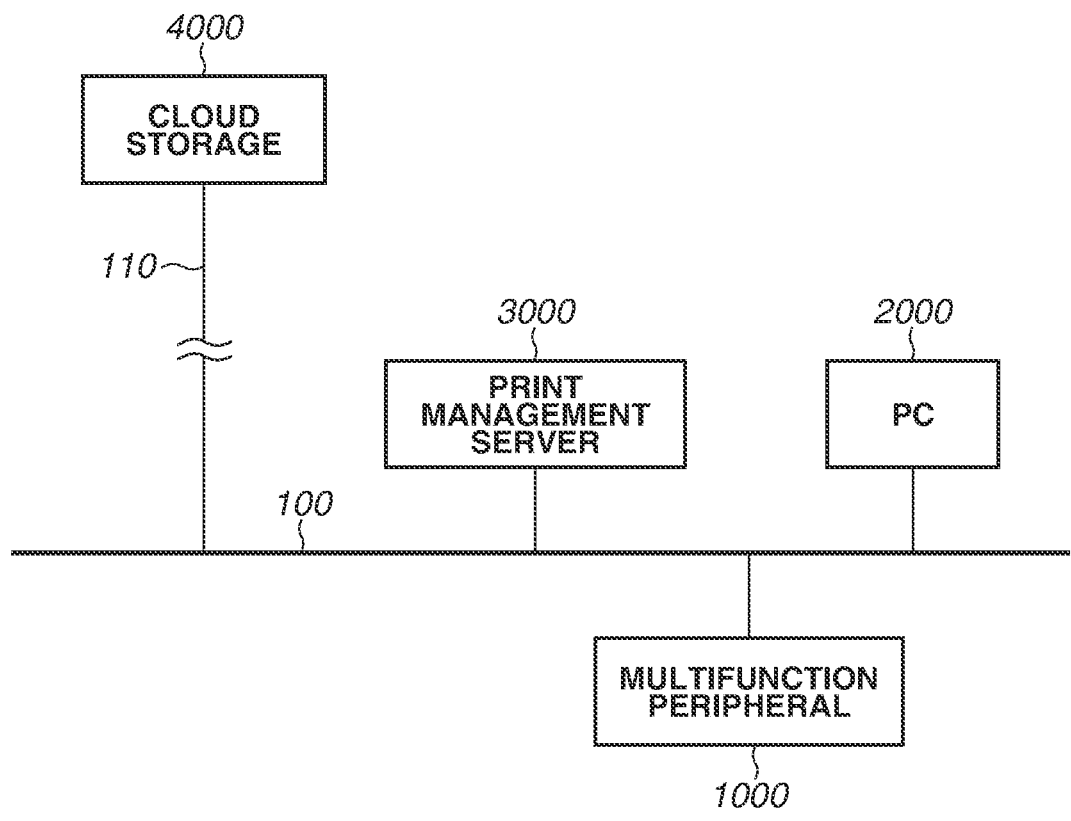
FIG. 1 is an example of a system configuration diagram according to exemplary embodiments.

FIG. 1 is a network configuration diagram according to a first exemplary embodiment.

A multifunction peripheral 1000 having a print function for forming an image on a sheet can transmit and receive print data (also referred to as a "print job"), scanned image data, and management information regarding a device to and from another information processing apparatus via a network 100.

The multifunction peripheral 1000 can also communicate with a print management server 3000 via the network 100. The print management server 3000 and a PC 2000 can communicate with cloud storage 4000 and a file server via an external network 110. Although FIG. 1 illustrates a single multifunction peripheral 1000, a single print management server 3000, and a single cloud storage 4000, a configuration may be employed in which a plurality of multifunction peripherals 1000, a plurality of print management servers 3000, and a plurality of cloud storage devices 4000 are present, and the present disclosure is not limited. Although the multifunction peripheral 1000 and the print management server 3000 are separate apparatuses in FIG. 1, the multifunction peripheral 1000 may include the role of the print management server 3000, and the present disclosure is not particularly limited.

Figure 2:
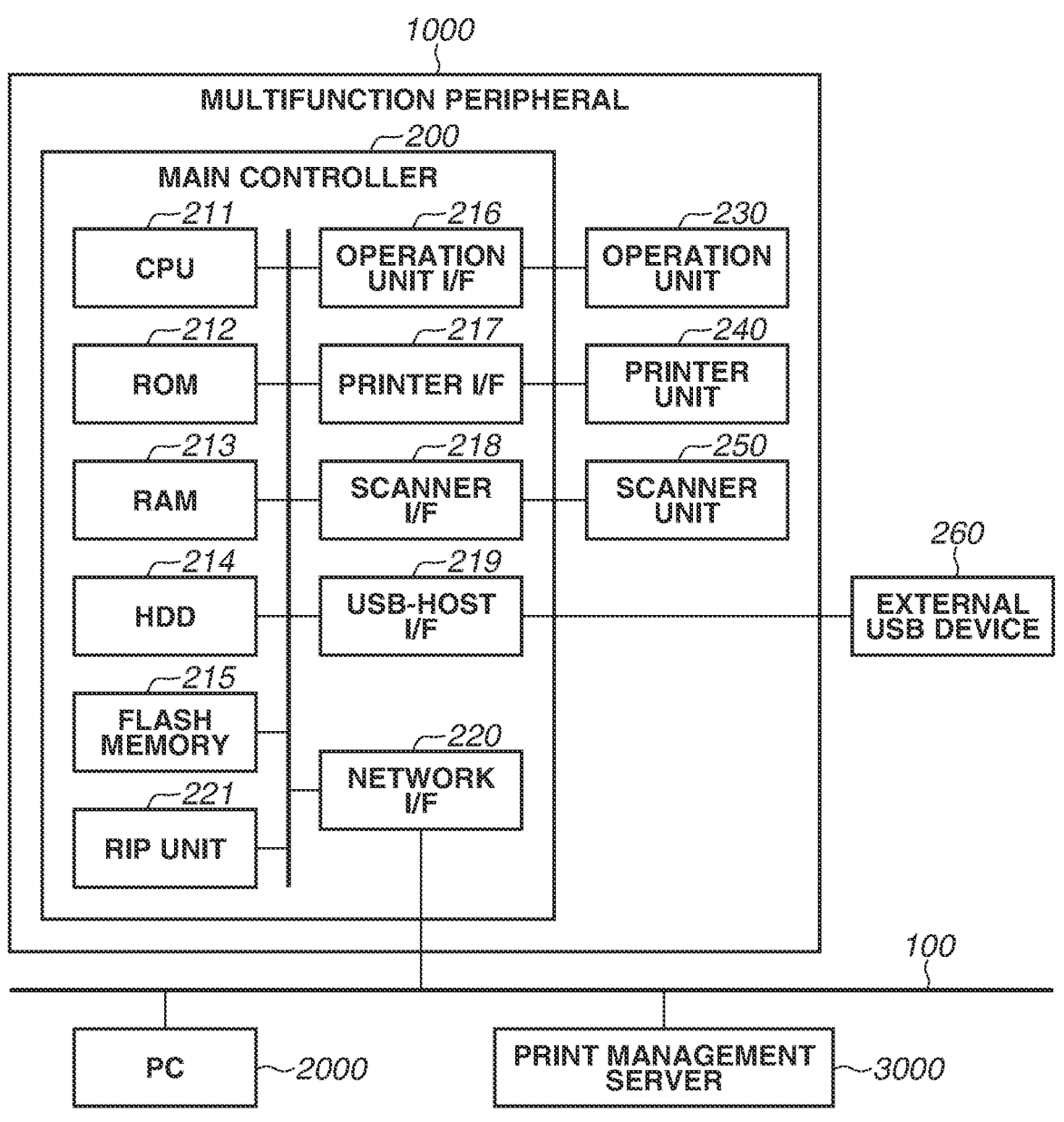
FIG. 2 is an example of a hardware configuration diagram of a multifunction peripheral according to the exemplary embodiments.

FIG. 2 is a hardware block diagram illustrating the configuration of the multifunction peripheral 1000.

A central processing unit (CPU) 211 executes a software program for the multifunction peripheral 1000 and controls the entirety of the apparatus. A read-only memory (ROM) 212 is a read-only memory and stores a boot program and a fixed parameter for the multifunction peripheral 1000. A random-access memory (RAM) 213 is a random-access memory and is used to store a program and temporary data when the CPU 211 controls the multifunction peripheral 1000. An HDD 214 is a hard disk drive and stores system software, an application, and various pieces of data. The CPU 211 executes the boot program stored in the ROM 212, loads a program stored in the HDD 214 into the RAM 213, and executes the loaded program, thereby controlling the operation of the multifunction peripheral 1000.

A flash memory 215 stores a loader, a kernel, and an application. The flash memory 215 also stores an execution program, license information for enabling the function of the multifunction peripheral 1000, and a signature and a public key for use in verification used to detect a falsification of a program. An operation unit interface (I/F) 216 is an I/F for transmitting an instruction input by a user of the multifunction peripheral 1000 through an operation unit 230 to the CPU 211. The operation unit I/F 216 also receives a processing content for switching the content displayed on the operation unit 230 from the CPU 211 and transmits the processing content to the operation unit 230. In the operation unit 230, a liquid crystal display unit having a touch panel function and a keyboard are provided. The operation unit 230 displays the state of the multifunction peripheral 1000 and an operation menu, and the operation unit 230 receives an instruction from the user.

A raster image processer (RIP) unit 221 performs a rendering process on print data, thereby acquiring a raster image.

A printer I/F 217 controls a printer unit 240 to perform a printing process. In the present exemplary embodiment, the printer unit 240 is referred to as a "printer unit". A scanner I/F 218 controls a scanner unit 250 to read a document. A Universal Serial Bus (USB)-host I/F 219 is an interface for connecting a main controller 200 and an external USB device 260. Examples of the external USB device 260 include a fax unit. In the example of the fax unit, the external USB device 260 transmits fax based on image data transferred from the HDD 214 via the USB-host I/F 219. The external USB device 260 also generates image data based on received data and transfers the image data to the HDD 214 via the USB -host I/F 219. The image data stored in the HDD 214 is printed on a storage medium, such as a recording sheet, by the printer unit 240 as described above. Examples of the external USB device 260 also include a USB memory and a USB keyboard. The USB memory can also transfer an update file required to update firmware.

A network I/F 220 controls the transmission and reception of data to and from the network 100.

Figure 3:
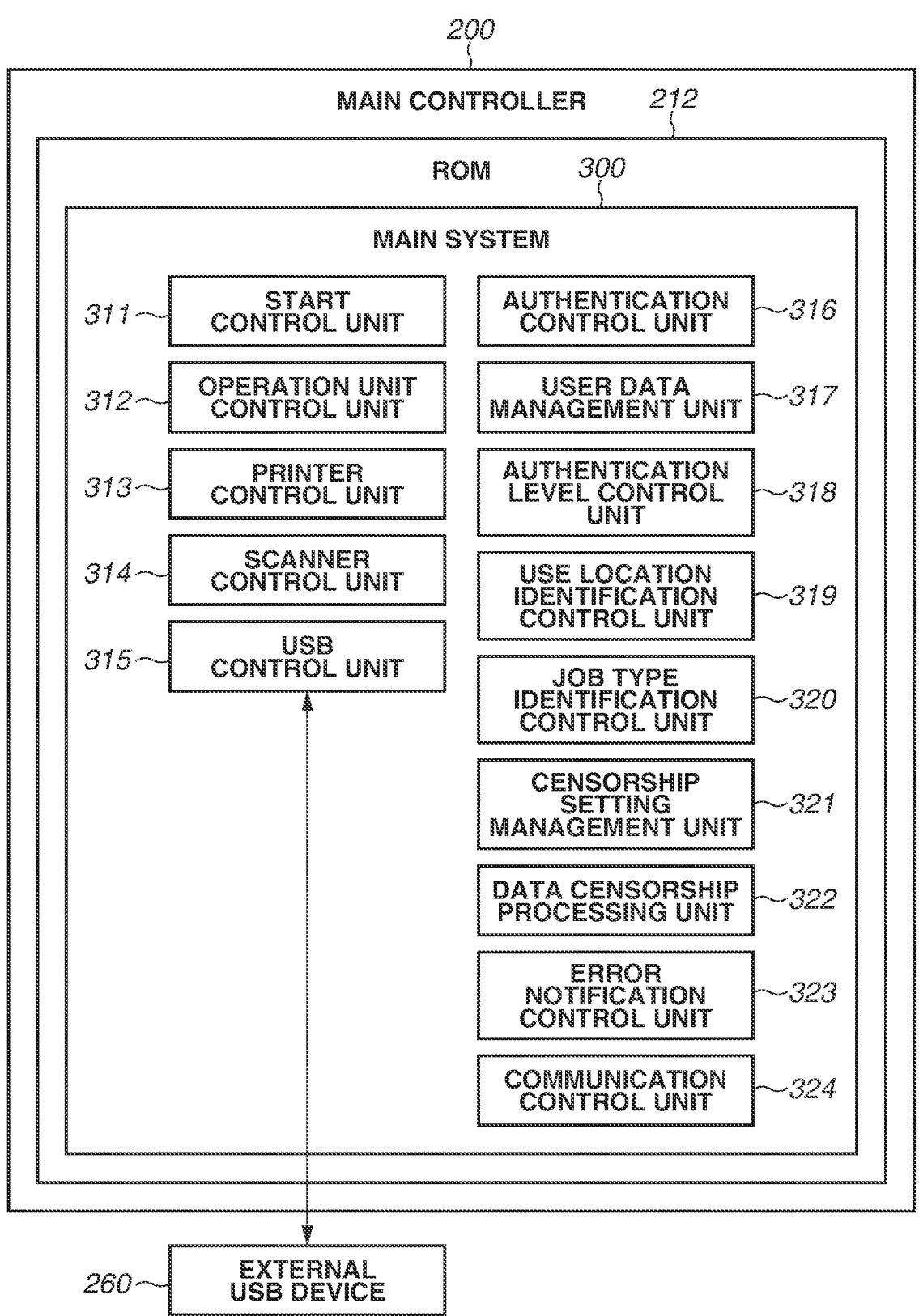
FIG. 3 is an example of a software configuration diagram of the multifunction peripheral according to the exemplary embodiments.

FIG. 3 is a block diagram illustrating software modules indicating the configuration of the multifunction peripheral 1000. The software modules illustrated in FIG. 3 are achieved by the CPU 211 executing programs loaded into the RAM 213.

A start control unit 311 is a program for controlling processing when the multifunction peripheral 1000 starts. The start control unit 311 starts an operating system (OS) for the main controller 200 and starts up a main system 300 for causing various programs to operate. An operation unit control unit 312 is a program for controlling the operation unit 230 via the operation unit I/F 216. The operation unit control unit 312 functions as a display control unit for displaying a screen on a display unit included in the operation unit 230. A printer control unit 313 is a module for controlling printing using the printer unit 240. A scanner control unit 314 is a module for executing the function of reading a document using the scanner unit 250. A USB control unit 315 is a program for controlling a USB device connected to the USB-host I/F 219 via the USB-host I/F 219. A user data management unit 317 is a program for managing data of users allowed to use the multifunction peripheral 1000. Based on user information registered in the user data management unit 317, an authentication control unit 316 controls the authentication of a user performing login authentication to log into the multifunction peripheral 1000.

An authentication level control unit 318 is a program for determining the authentication level of a user authenticated by the authentication control unit 316. A use location identification control unit 319 is a program for identifying the location of the multifunction peripheral 1000 and the location where an output is provided by a job. As the method for identifying the location, location information may be acquired based on the configuration of the network, or the installation location of the multifunction peripheral 1000 may be held in advance in a censorship setting management unit 321, and the location may be determined based on the setting value of the installation location.

A job type identification control unit 320 is a program for determining the type of a job based on job data submitted to the multifunction peripheral 1000.

The censorship setting management unit 321 is a program for managing a plurality of types of banned word lists saved in a storage area of the HDD 214. The censorship setting management unit 321 provides a setting value related to a censorship process, such as a banned word input by an administrator who manages the multifunction peripheral 1000, to a data censorship processing unit 322 when print data is censored.

The data censorship processing unit 322 is a program for controlling the censorship process on the print data based on the banned word lists registered in the censorship setting management unit 321.

An error notification control unit 323 controls an error content of which the operation unit 230 or an external device connected to the multifunction peripheral 1000 via the network 100 is notified when a problem is detected in the content of the print data by the print data censorship process. A communication control unit 324 is a module for controlling a plurality of communication protocols supported by the multifunction peripheral 1000 via the network I/F 220.

Figure 4A:
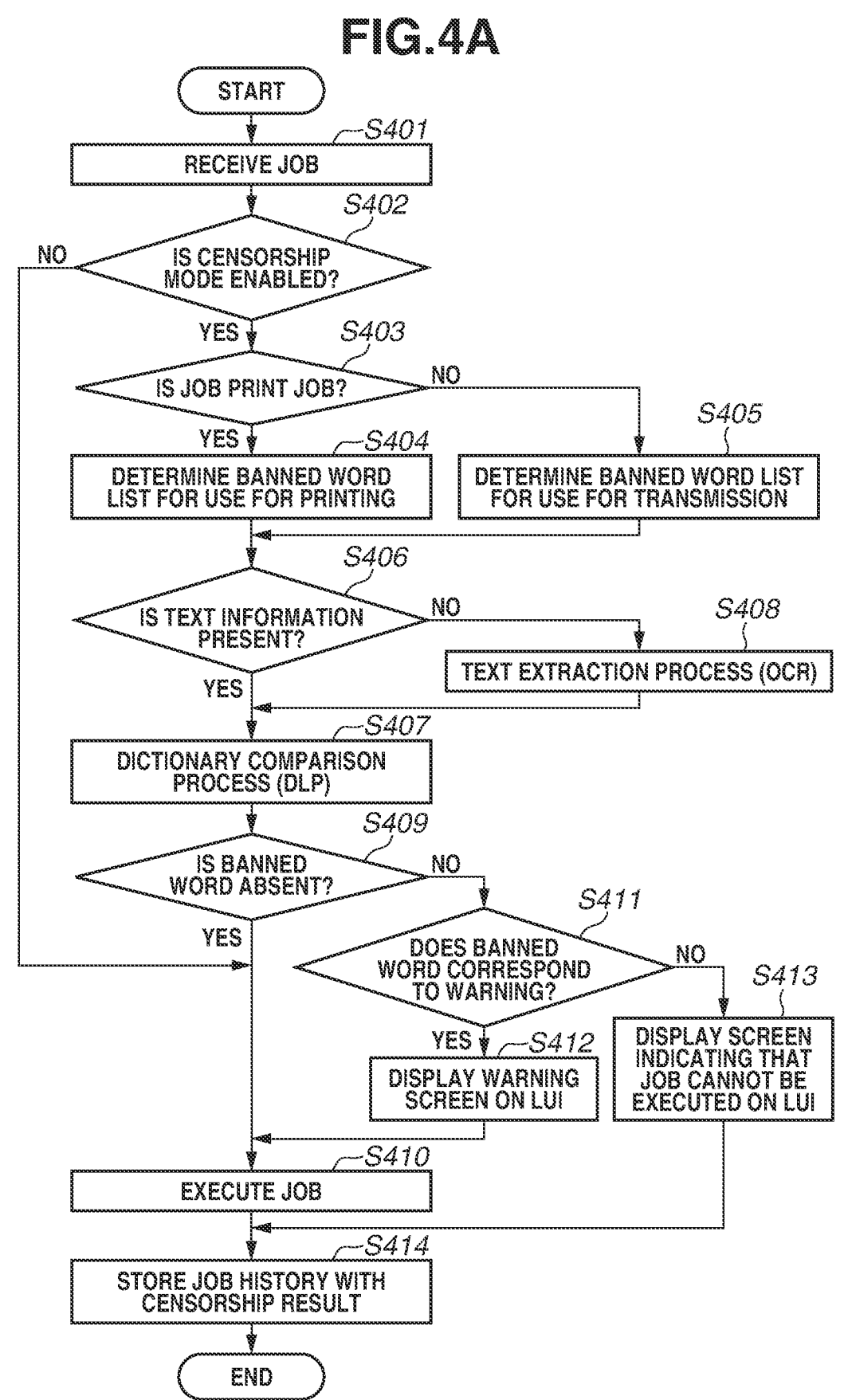
FIG. 4A is an example of a flowchart illustrating a flow of processing of a multifunction peripheral according to a first exemplary embodiment.
Figures 4B, 4C:
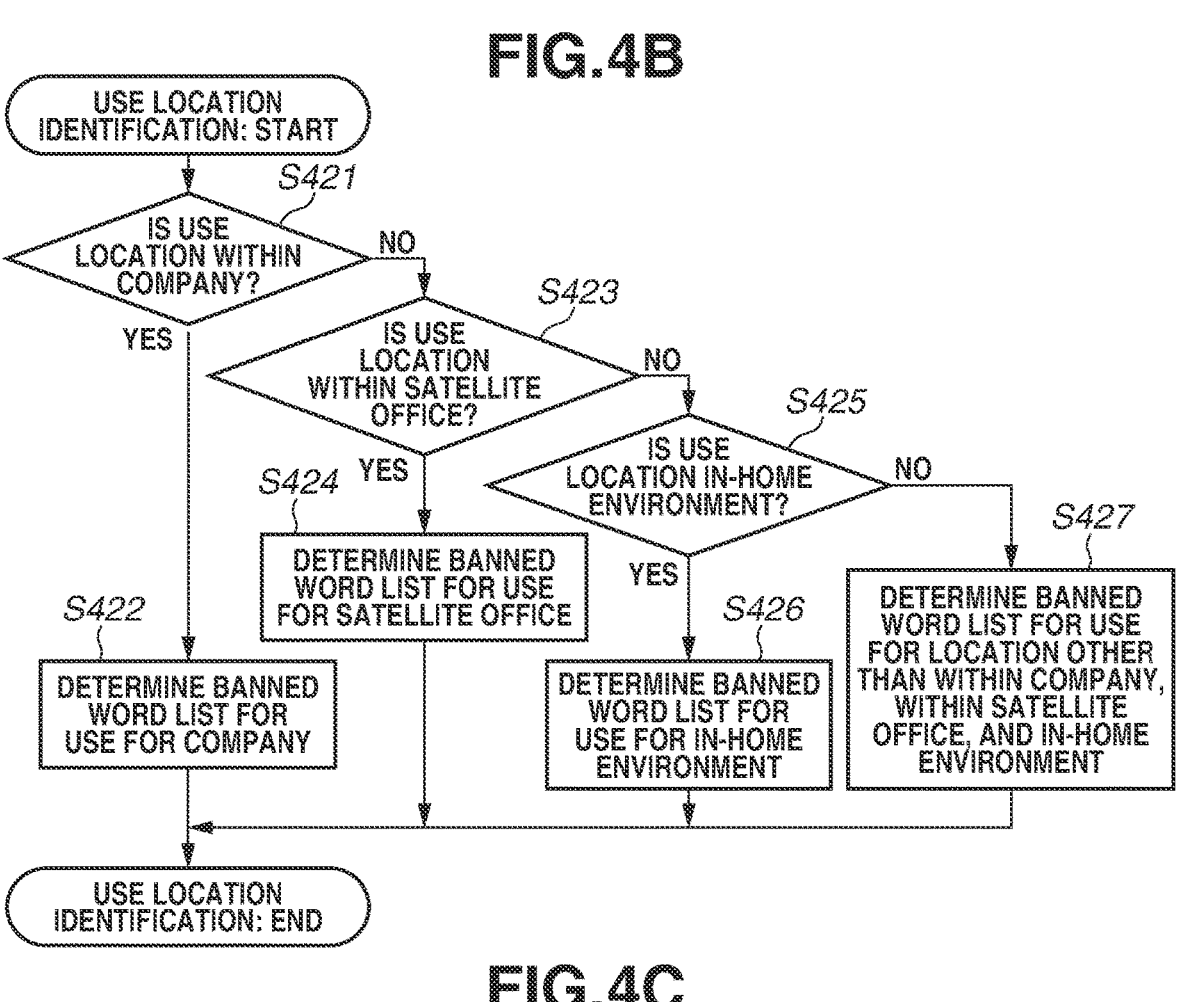
FIG. 4B is an example of a flowchart illustrating a method for identifying a use location of the multifunction peripheral according to the first exemplary embodiment.
FIG. 4C is an example of a flowchart illustrating a method for identifying an authentication level of a user of the multifunction peripheral according to the first exemplary embodiment.

FIGS. 4A to 4C are flowcharts illustrating the flows of the processing of the multifunction peripheral 1000 according to the first exemplary embodiment after a job is received by the multifunction peripheral 1000. Programs for achieving operations described in these flowcharts are stored in the flash memory 215 and are loaded into the RAM 213 and executed by the CPU 211. With reference to FIGS. 4A to 4C, a description is given of the process of switching character string lists for use in a dictionary comparison process based on a predetermined condition. FIG. 4A illustrates a flowchart when character string lists for use in the dictionary comparison process are switched based on the job type of the received job as the predetermined condition. FIG. 4B illustrates a flowchart when character string lists for use in the dictionary comparison process are switched based on the installation environment of the multifunction peripheral 1000 as the predetermined condition. FIG. 4C illustrates a flowchart when character string lists for use in the dictionary comparison process are switched based on the authentication level of the logged-in user. First, the processing in FIG. 4A is described. In step S401, the multifunction peripheral 1000 receives job data from the user. Specifically, the user logs into the multifunction peripheral 1000 and indicates job data to the multifunction peripheral 1000. Alternatively, the user sends print data from the PC 2000 to the multifunction peripheral 1000 via the network 100. The data input in step 5401 may be data in a Portable Document Format (PDF) format, or may be data in a page description language (PDL) format, and the present disclosure is not limited.

Next, in step S402, the main controller 200 acquires a setting value registered in the censorship setting management unit 321 and confirms whether the censorship mode of the multifunction peripheral 1000 is enabled. If the censorship mode is enabled (YES in step S402), the processing proceeds to step S403. If it is determined that the censorship mode is not enabled (NO in step S402), a censorship process is not performed, and the processing proceeds to step S410.

In step S403, the job type identification control unit 320 determines whether the submitted job is a job for printing. If it is determined in step S403 that the submitted job is a job for printing (YES in step S403), then in step S404, the job type identification control unit 320 determines a banned word list for printing among banned word lists registered in advance in the censorship setting management unit 321. If it is determined in step S403 that the job submitted to the multifunction peripheral 1000 is not a job for printing (NO in step S403), the job type identification control unit 320 determines that the submitted job is a job for transmission. Then, in step S405, the job type identification control unit 320 determines a banned word list for transmission among the banned word lists registered in advance in the censorship setting management unit 321. Alternatively, the following configuration may be employed. In step S403, the type of the submitted job is determined. If the type of the submitted job is a print job, the processing proceeds to step S404. If the type of the submitted job is a transmission job, the processing proceeds to step S405.

In step S406, the data censorship processing unit 322 determines whether text is present in the job data. If it is determined that text is not present (NO in step S406), the processing proceeds to step S408. If text information is present (YES in step S406), the processing proceeds to step S407. The "text" as used herein refers to, for example, text information regarding PDL data or searchable PDF.

In step S408, the data censorship processing unit 322 performs a text extraction process (optical character recognition (OCR)) on the job data in the job and extracts text information from the job data. Then, the processing proceeds to step S407.

In step S407, using the banned word list determined in step S404 or S405, the data censorship processing unit 322 performs the process of determining whether a banned word is present in the text data (a dictionary comparison process (Data Loss Prevention(DLP))). Then, the processing proceeds to step S409. The "banned word" as used herein refers to a word registered in the censorship setting management unit 321 by the administrator. The method for registering the banned word will be described below. In step S409, the data censorship processing unit 322 determines whether a banned word is absent (e.g., whether every banned word is absent) as a result of the dictionary comparison process in step S407. If it is determined that a banned word is present as a result of the comparison (NO in step S409), the processing proceeds to step S411. If it is determined that a banned word is absent (e.g., that every banned word is absent) (YES in step S409), the data censorship processing unit 322 determines that the job can be executed. Then, the processing proceeds to step S410.

In step S410, the main controller 200 executes the job submitted by the user of the multifunction peripheral 1000. In step S411, based on information set in the censorship setting management unit 321, the data censorship processing unit 322 determines whether an operation after the banned word present in the text data is censored is a warning. If it is determined in step S411 that the operation is a warning (YES in step S411), the processing proceeds to step S412. If it is determined that the operation is not a warning (NO in step S411), the processing proceeds to step S413. In step S412, the error notification control unit 323 displays a warning screen (FIG. 5B) on a local user interface (LUI: the operation unit 230) of the multifunction peripheral 1000. Then, the processing proceeds to step S410.

In step S413, the error notification control unit 323 displays a screen indicating that the job cannot be executed (FIG. 5A) on the LUI of the multifunction peripheral 1000.

Finally, in step S414, the main controller 200 stores job history with the result of determining whether the job can be executed in step S409.

In the first exemplary embodiment, the types of jobs are described as the printing and the transmission. The multifunction peripheral 1000, however, has not only the print function and the transmission function but also various functions such as a fax function and an external storage data transmission. Thus, the types of jobs in the present exemplary embodiment may be other than the printing and the transmission.

Although a description has been given above of an example where banned word lists are switched according to the job type, banned word lists may be switched according to the location, or may be switched according to the authentication level, and the present disclosure is not limited. Possible examples of the location include locations such as within a company, within a satellite office, and an in-home environment. Possible examples of the authentication level include an administrator and a general user.

FIG. 4B is a flowchart illustrating the flow of a method for identifying the use location in a case where banned word lists are switched according to the use location of the multifunction peripheral 1000. As described above, possible examples of the use location include locations different in security level, such as within a company, within a satellite office, and an in-home environment.

The flow illustrated in FIG. 4B may be performed instead of steps S403 to S405 in FIG. 4A, or may be performed if the installation location of the multifunction peripheral 1000 is changed.

First, in step S421, based on location information registered in the censorship setting management unit 321, the use location identification control unit 319 determines whether the use location of the multifunction peripheral 1000 is within the company. If the use location identification control unit 319 determines in step S421 that the use location is within the company (YES in step S421), the processing proceeds to step S422. In step S422, the use location identification control unit 319 determines a banned word list for use for the company and provides the determined banned word list to the data censorship processing unit 322. If it is determined in step S421 that the use location is not within the company (NO in step S421), the processing proceeds to step S423. In step S423, the use location identification control unit 319 determines whether the use location is within the satellite office. If it is determined in step S423 that the use location is within the satellite office (YES in step S423), the processing proceeds to step S424. In step S424, the use location identification control unit 319 determines a banned word list for use for the satellite office and provides the determined banned word list to the data censorship processing unit 322. If it is determined in step S423 that the use location is not within the satellite office (NO in step S423), the processing proceeds to step S425. In step S425, the use location identification control unit 319 determines whether the use location is the in-home environment. If it is determined that the use location is the in-home environment (YES in step S425), then in step S426, the use location identification control unit 319 determines a banned word list for use for the in-home environment and provides the determined banned word list to the data censorship processing unit 322. In step S427, the use location identification control unit 319 determines a banned word list for use for a location other than within the company, within the satellite office, and the in-home environment and provides the determined banned word list to the data censorship processing unit 322.

In the above description, the use location is within the company, within the satellite office, the in-home environment, or the location other than within the company, within the satellite, and the in-home environment, but is not limited to this. FIG. 4C is a flowchart illustrating the flow of a method for identifying the authentication level in a case where banned word lists for use are switched according to the authentication level of the user of the multifunction peripheral 1000. As described above, possible examples of the authentication level include an administrator and a general user. The flow illustrated in FIG. 4C may be performed instead of steps S403 to S405 in FIG. 4A, or may be performed if the multifunction peripheral 1000 receives user authentication information from the user.

First, in step S431, based on logged-in user information and user data managed by the user data management unit 317, the authentication level control unit 318 determines whether the authentication level of the user of the multifunction peripheral 1000 is the administrator. If it is determined in step S431 that the authentication level of the user is the administrator (YES in step S431), the processing proceeds to step S432. In step S432, the authentication level control unit 318 determines a banned word list for use for the administrator and provides the determined banned word list to the data censorship processing unit 322.

If it is determined in step S431 that the authentication level is not the administrator (NO in step S431), the processing proceeds to step S433. In step S433, the authentication level control unit 318 determines whether the authentication level of the user of the multifunction peripheral 1000 is the general user. If it is determined that the authentication level is the general user (YES in step S433), the processing proceeds to step S434. In step S434, the authentication level control unit 318 determines a banned word list for use for the general user and provides the determined banned word list to the data censorship processing unit 322.

If it is determined in step S433 that the authentication level is not the general user (NO in step S433), the processing proceeds to step S435. In step S435, the authentication level control unit 318 determines a banned word list for use for an authentication level other than the administrator and the general user.

Examples of the authentication level other than the administrator and the general user include a job of an unknown user. In the case of the job of an unknown user, for example, the censorship process may be performed using a banned word list at a high censorship level, or a configuration may be employed in which a banned word list for an unknown user may be set in advance.

In the above description, the authentication level is the administrator, the general user, or the authentication level other than the administrator and the general user (the job of an unknown user), but some embodiments are not limited to this. Although in FIG. 4C, a case has been described where the user performs user authentication on the multifunction peripheral 1000 on the assumption of so-called reservation printing or a scan/send job, the some embodiments are not limited to this. For example, a job may be employed in which if the user gives a print instruction to the PC 2000, a print product is output from the multifunction peripheral 1000 without the user logging into the multifunction peripheral 1000. In this case, in step S431, the authentication level control unit 318 determines the authentication level based on the user data managed by the user data management unit 317 and user information included in attribute information regarding the job.

Based on the above, banned word lists for use in the censorship process are switched according to the type of the job submitted by the user, whereby the result of the censorship process differs even with the same document data. Thus, it is possible to prevent an excessive function restriction and also prevent a confidential document from leaking to outside.

Figure 5A:
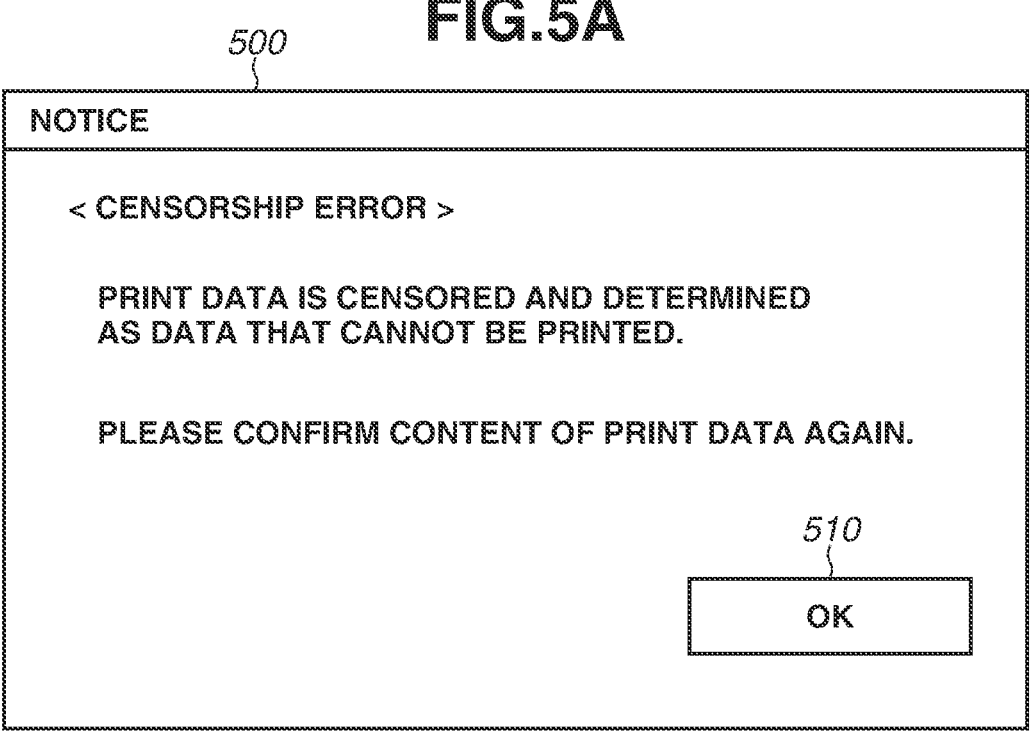
FIG. 5A is an example of a notification screen when a censorship error occurs.

FIG. 5A is an example of an error screen 500 displayed on the operation unit 230 when it is determined in step S409 in FIG. 4A that printing cannot be executed. The error screen 500 displays a message urging the confirmation of the content of the print data and an "OK" button 510. If the user presses the "OK" button 510, the screen displayed on the operation unit 230 transitions to a previous operation screen.

Figure 5B:
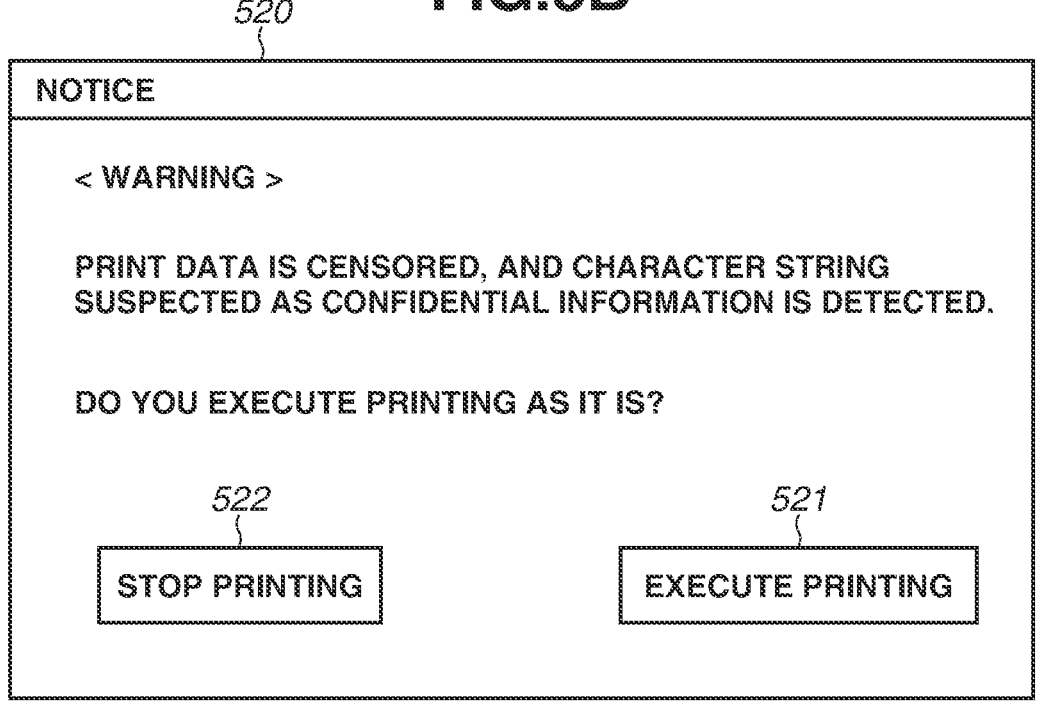
FIG. 5B is an example of a notification screen when a censorship warning is displayed.

FIG. 5B is an example of a warning screen 520 displayed on the operation unit 230 when it is determined in step S411 in FIG. 4A that the operation after the banned word present in the text data is censored is a warning. The warning screen 520 displays a message indicating that confidential information is included in the print data, an "execute printing" button 521, and a "stop printing" button 522. If the user presses the "execute printing" button 521, the warning screen 520 is closed and transitions to a printing execution screen. If the user presses the "stop printing" button 522, the warning screen 520 is closed and transitions to a previous operation screen or a home screen.

Figure 6:
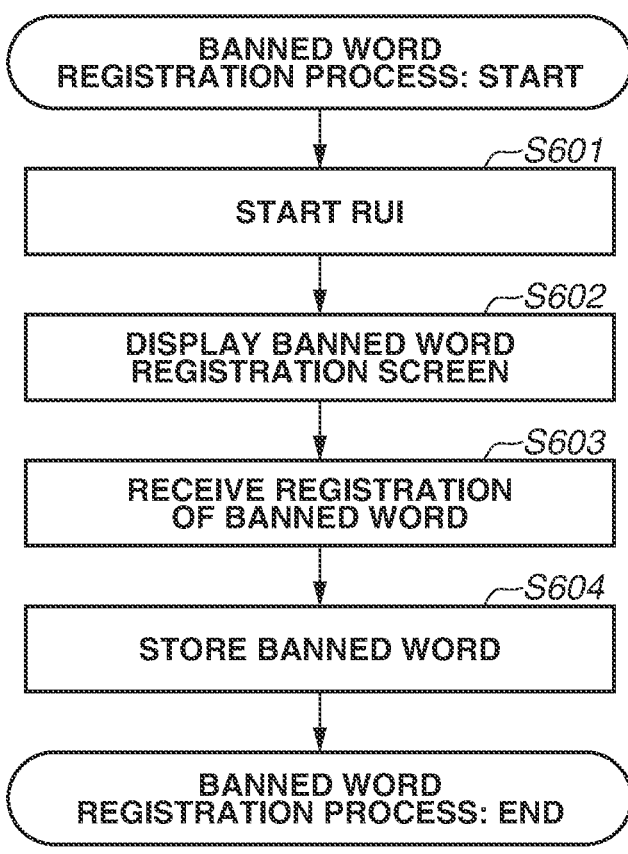
FIG. 6 is an example of a flowchart illustrating a flow of a banned word registration process according to the first exemplary embodiment.

FIG. 6 is a flowchart illustrating a process for registering the character string of a banned word for use in the dictionary comparison process (DLP) performed in step S407. The "banned word" is, for example, a word indicating confidential information. The administrator who manages the multifunction peripheral 1000 registers the character string of the banned word. For example, if a banned word is present in the text information regarding the print data, it is determined that the print data includes confidential information and cannot be printed. Thus, it is possible to decrease the security risk that the print data including the confidential information becomes a print document and leads to information leakage.

In step S601, the multifunction peripheral 1000 connects to the PC 2000 via the network 100 and displays on a web browser of the PC 2000 a screen that allows the user to operate the multifunction peripheral 1000. This operation unit of the multifunction peripheral 1000 displayed on the PC 2000 or a mobile terminal is referred to as a "remote user interface (UI) (RUI)".

Next, in step S602, the main controller 200 of the multifunction peripheral 1000 displays on the RUI a "censorship settings" screen 700 (FIG. 7) for registering a banned word. FIG. 7 is an example of a "censorship settings" screen for registering a banned word. The screen 700 includes a censorship mode setting 701, item selection 702, a censorship keyword (banned word) setting 703, an "add" button 710, an "OK" button 720, and a "cancel" button 730. The censorship mode setting 701 is a button for enabling the censorship mode. If the user (the administrator) inputs a banned word and presses the "add" button 710, the input banned word is added to items of registered keywords. In FIG. 7, as examples of a banned word, character strings "confidential", "important", and "internal use only" are registered. Although FIG. 7 illustrates setting examples such as "stop (operation)" and "display warning (to user)" as examples of an operation when the censorship operation is executed, these are merely examples, and the operation may be an operation such as "notify (administrator thereof) by email" aside from the above setting examples. In the present exemplary embodiment, one or more character strings displayed in the censorship keyword setting 703 are referred to as a "character string list". For example, in FIG. 7, as an example of a character string list for use in a transmission job, three character strings, namely "confidential" and "internal use only", which are character strings for performing a stop process, and "important", which is a character string for displaying a warning, are collectively referred to as a "character string list".

If the button 720 is selected, input setting data is registered in the censorship setting management unit 321.

Next, in step S603, the registration of a banned word by the user is received. Next, in step S604, the banned word input in step S603 is saved in the censorship setting management unit 321. If the saving is completed, the banned word registration process ends.

Although a configuration is employed in which the banned word registration process is performed through the remote UI in the present exemplary embodiment, the method for performing the banned word registration process is not particularly limited. For example, a configuration may be employed in which a banned word is registered through the operation unit 230 of the multifunction peripheral 1000.

A description has been given above of a method for performing control according to the situation, such as switching banned word lists for use based on information regarding the authentication level of the user, the use location, or the job type, thereby preventing a reduction in convenience for the user due to a function restriction resulting from a censorship, and also preventing a confidential document from leaking to outside. For example, a transmission job to be transmitted to outside and a print job can be censored using different banned word lists. Thus, it is possible to prevent a reduction in convenience due to an excessive function restriction in a print job and also restrict a function to prevent a confidential document from leaking to outside. Thus, it is possible to flexibly perform a censorship process based on a condition such as the authentication level, the use location, or the job type.

Next, a second exemplary embodiment of the present disclosure is described.

In the first exemplary embodiment, after a job is submitted to the multifunction peripheral 1000, a censorship process is executed by switching banned word lists for use in the censorship process based on a single condition such as the job type (or the authentication level or the use location), and it is determined whether the job can be executed.

If, however, banned word lists for use in the censorship process are switched based on a single condition, it may not be possible to perform flexible control according to the situation. As a specific example, it is not possible to perform control for increasing the security level of a banned word for a transmission job while also permitting the transmission job to be executed in the case of the administrator.

In the second exemplary embodiment, on the assumption of the above case, a description is given of a method for switching banned word lists for use based on a plurality of conditions, such as the authentication level, the use location, and the job type.

In the second exemplary embodiment, descriptions are not given of portions similar to those in the first exemplary embodiment, such as a network configuration diagram, the hardware configuration and the software configuration of a multifunction peripheral 1000 as an information processing apparatus, and a printing process including the reception of a print execution instruction and the execution of printing.

Figure 8A:
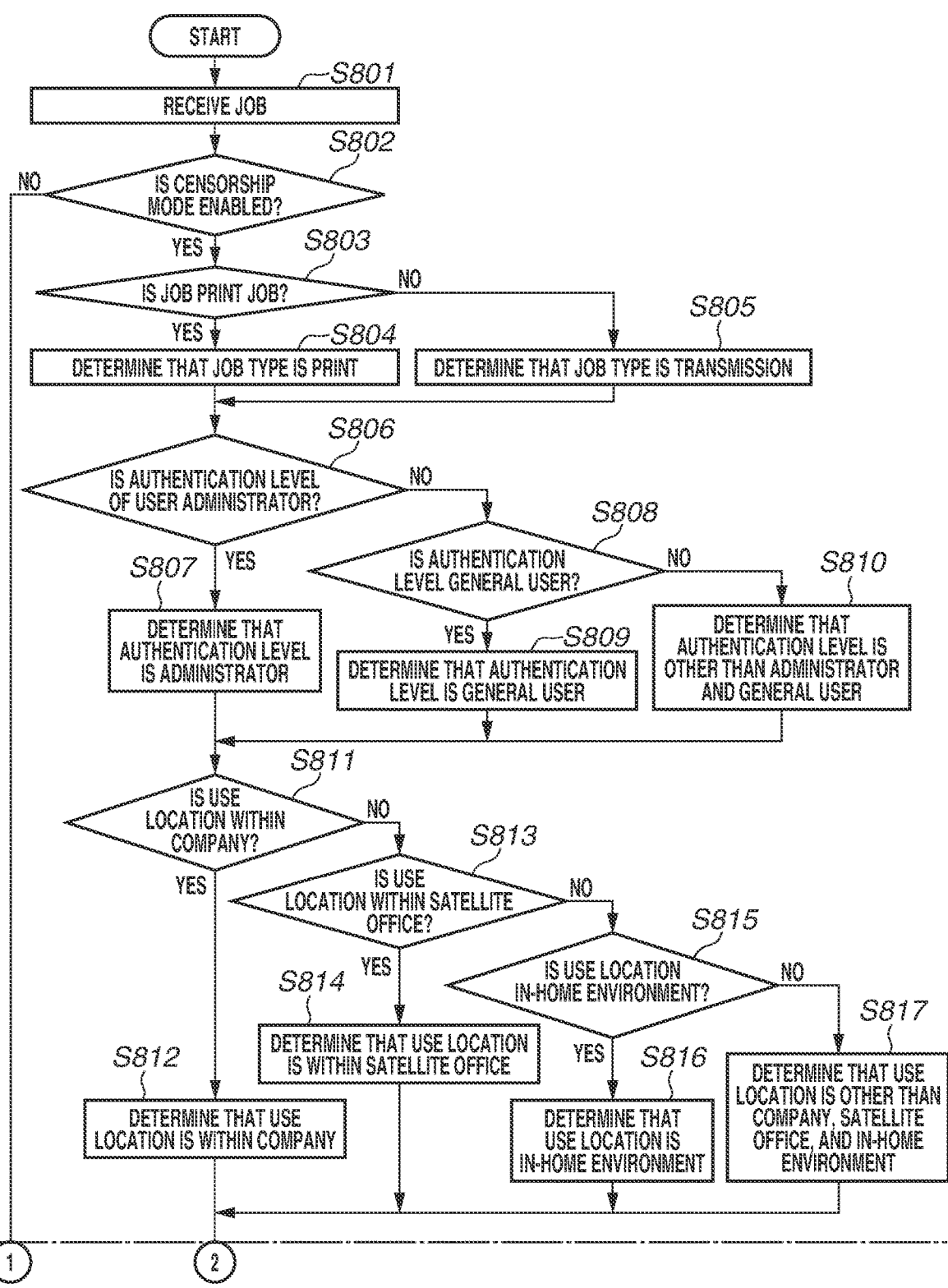
FIGS. 8A and 8B are an example of a flowchart illustrating a flow of processing of a multifunction peripheral according to a second exemplary embodiment.
Figure 8B:
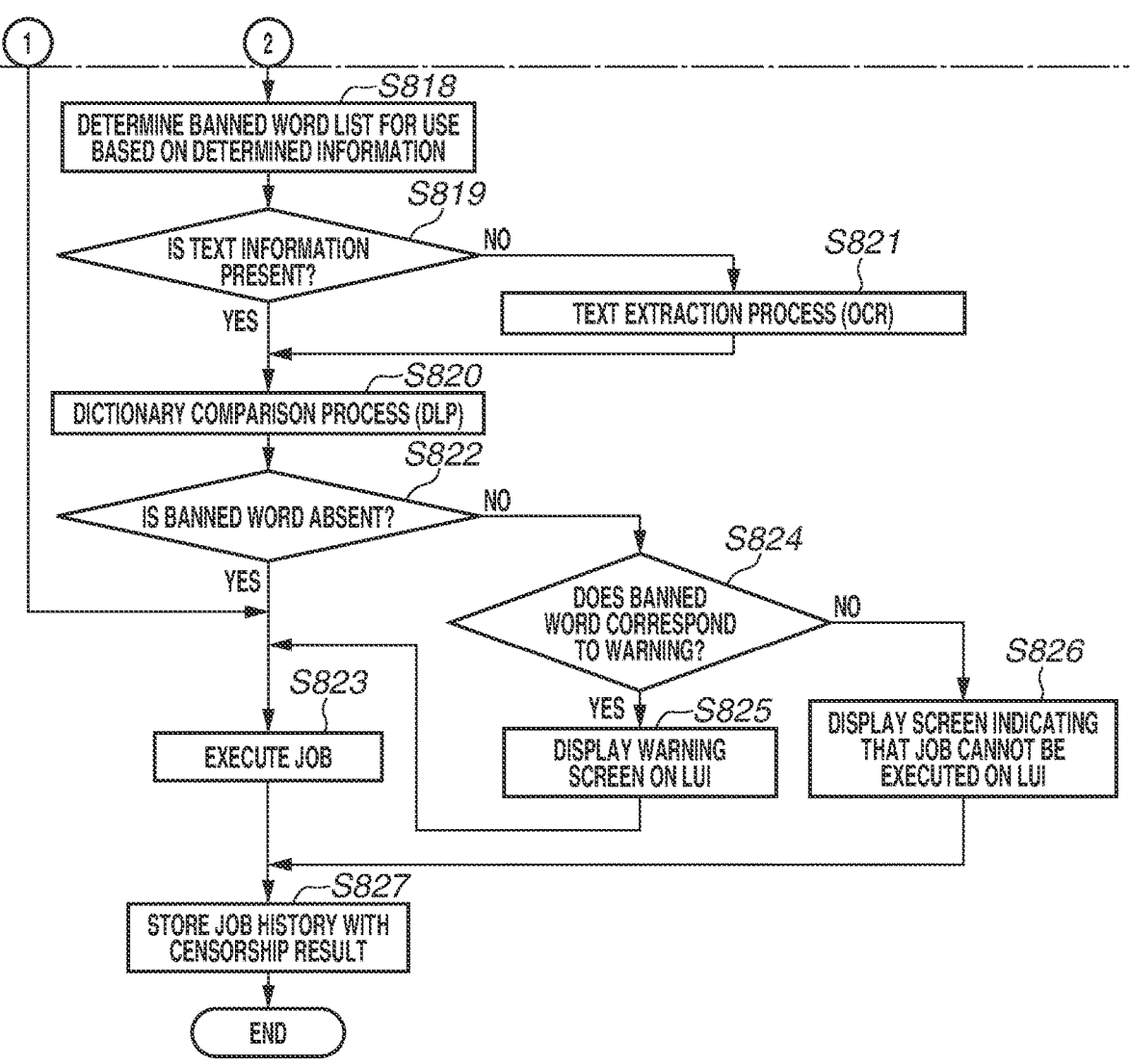

FIGS. 8A and 8B are a flowchart illustrating the flow of the processing of the multifunction peripheral 1000 according to the second exemplary embodiment after a job is received by the multifunction peripheral 1000. Programs for achieving operations described in this flowchart are stored in the flash memory 215 and are loaded into the RAM 213 and executed by the CPU 211.

Steps S801 and S802 are similar to steps S401 and S402, respectively, according to the first exemplary embodiment.

In step S803, the job type identification control unit 320 determines whether the type of the job received in step S801 is the printing. If the type of the job is the printing (YES in step S803), the processing proceeds to step S804. If the type of the job is not the printing (NO in step S803), the processing proceeds to step S805.

In step S804, it is determined that the type of the job received in step S801 is the printing. In step S805, it is determined that the job type is the transmission.

Next, in step S806, the authentication level control unit 318 determines whether the authentication level of the user having submitted the job to the multifunction peripheral 1000 is the administrator. If the authentication level control unit 318 determines that the authentication level is the administrator (YES in step S806), then in step S807, the authentication level control unit 318 identifies the authentication level as the administrator. If the authentication level control unit 318 determines in step S806 that the authentication level is not the administrator (NO in step S806), the processing proceeds to step S808. In step S808, the authentication level control unit 318 determines whether the authentication level is the general user. If it is determined in step S808 that the authentication level is the general user (YES in step S808), the processing proceeds to step S809. In step S809, the authentication level control unit 318 determines that the authentication level of the user of the multifunction peripheral 1000 is the general user. If it is determined in step S808 that the authentication level is not the general user (NO in step S808), the processing proceeds to step S810. In step S810, the authentication level control unit 318 determines that the authentication level is other than the administrator and the general user.

Next, in step S811, the use location identification control unit 319 determines whether the use location of the multifunction peripheral 1000 is within the company. If the use location identification control unit 319 determines that the use location is within the company (YES in step S811), then in step S812, the use location identification control unit 319 identifies the use location as within the company. If the use location identification control unit 319 determines in step S811 that the use location of the multifunction peripheral 1000 is not within the company (NO in step S811), the processing proceeds to step S813. In step S813, the use location identification control unit 319 determines whether the use location is within the satellite office. If it is determined in step S813 that the use location is within the satellite office (YES in step S813), the processing proceeds to step S814. In step S814, the use location identification control unit 319 determines that the use location is within the satellite office. If it is determined in step S813 that the use location is not within the satellite office (NO in step S813), the processing proceeds to step S815. In step S815, the use location identification control unit 319 determines whether the use location is the in-home environment. If it is determined in step S815 that the use location is the in-home environment (YES in step S815), the processing proceeds to step S816. In step S816, the use location identification control unit 319 determines that the use location is the in-home environment. If it is determined that the use location is not the in-home environment (NO in step S815), the processing proceeds to step S817. In step S817, the use location identification control unit 319 determines that the use location is other than within the company, within the satellite office, and the in-home environment.

Although the use location is the use location of the multifunction peripheral 1000 in the above description, the use location may be determined based on the output destination of data according to the execution of the job. As a specific example, in a case where data is transmitted to outside by a transmission job, the location may be determined based on the output destination of a document. In the case of a print job, the location may be determined based on the output destination of print data.

Next, in step S818, a banned word list for use is determined based on the information regarding the job type, the use location, and the authentication level determined in steps S803 to S817, and the determined banned word list is provided to the censorship processing unit 322.

Steps S819 to S827 are similar to steps S406 to S414, respectively, according to the first exemplary embodiment.

Although banned word lists are switched based on three conditions in the second exemplary embodiment, banned word lists may be switched based on the combination of two conditions.

Based on the above, banned word lists for use are switched based not on a single condition but on the combination of a plurality of conditions, such as the authentication level, the use location, and the job type, whereby it is possible to prevent an excessive function restriction and also perform flexible control according to the situation.

According to the present exemplary embodiment, banned word lists can be switched according to the job even with the same document data. Thus, it is possible to prevent an excessive function restriction and also prevent a confidential document from leaking to outside.

Next, a third exemplary embodiment of the present disclosure is described.

In the first and second exemplary embodiments, after a job is submitted to the multifunction peripheral 1000, a censorship process is executed by switching banned word lists for use in the censorship process based on conditions such as the job type, the authentication level, and the use location, and it is determined whether the job can be executed.

In the third exemplary embodiment, a description is given of a method for switching banned word lists for use in a censorship process based on a condition other than the job type, the authentication level, and the use location.

FIG. 9 is a flowchart illustrating the flow of the processing of the multifunction peripheral 1000 according to the third exemplary embodiment after a job is received by the multifunction peripheral 1000. Programs for achieving operations described in this flowchart are stored in the flash memory 215 and are loaded into the RAM 213 and executed by the CPU 211.

Steps S901 and S902 are similar to steps S401 and S402, respectively, according to the first exemplary embodiment.

In step S903, the data censorship processing unit 322 confirms whether the censorship setting management unit 321 has a censorship setting according to the use time of the multifunction peripheral 1000. If the censorship setting according to the use time is present in step S903 (YES in step S903), the processing proceeds to step S904. If the censorship setting according to the use time is not present (NO in step S903), the processing proceeds to step S909.

In step S904, the data censorship processing unit 322 confirms the current time and determines a banned word list for the current time among banned word lists registered in the censorship setting management unit 321. Specifically, for example, the following control is performed. In a case where character string lists are switched between a time within business hours and a time outside the business hours, the time from 8 a.m. to 5 p.m. as the business hours is registered in advance as the time in which a first character string list is used. Then, the data censorship processing unit 322 confirms the current time. If the current time is between 8 a.m. and 5 p.m., the first character string list is used, and if the current time is outside the business hours, a second character string list is used. Steps S905 to S913 are similar to steps S406 to S414, respectively, according to the first exemplary embodiment.

Although banned word lists are switched based on a single condition such as the use time in the third exemplary embodiment, banned word lists may be switched based on the combination of a plurality of conditions by adding conditions as in the second exemplary embodiment, and the present disclosure is not limited.

Based on the above, banned word lists for use are switched according to the use time, whereby it is possible to prevent an excessive function restriction and also perform flexible control according to the situation.

According to the present exemplary embodiment, banned word lists can be switched according to the use time as a condition other than the type of the job, the authentication level, and the use location. Thus, for example, it is possible to prevent printing in working hours.

Other Exemplary Embodiments

Some embodiments can also be achieved by the process of supplying computer-executable instructions (e.g., a program) for achieving one or more functions of the above exemplary embodiments to a system or an apparatus via a network or a storage medium, and causing one or more processors of a computer of the system or the apparatus to read and execute the program. Also, some embodiments can also be achieved by a circuit (e.g., an application-specific integrated circuit (ASIC)) for achieving the one or more functions.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-153336, which was filed on Sep. 27, 2022 and which is hereby incorporated by reference herein in its entirety.

What is claimed is:

1. An image processing apparatus having a print function for printing an image of image data on a sheet and a transmission function for transmitting image data generated by scanning a document, the image processing apparatus comprising:

one or more memories; and one or more processors, wherein the one or more processors and the one or more memories are configured to:

register a plurality of character string lists including a first character string list composed of respective one or more character strings and a second character string list composed of respective one or more character strings and different in at least one character string from the first character string list;

receive a job;

determine that the received job is a print job or a transmission job;

perform, in a case where it is determined that the received job is the print job, a comparison process for comparing text information extracted from first image data instructed, in the print job, to be printed by the print function and the one or more character strings in the first character string list;

prohibit to print an image of the first image data using the print function in a case where the text information extracted from the first image data includes at least one of the one or more character strings in the first character string list;

perform, in a case where it is determined that the received job is the transmission job, a comparison process for comparing text information extracted from second image data instructed, in the transmission job, to be transmitted by the transmission function and the one or more character strings in the second character string list; and prohibit to transmit the second image data using the transmission function in a case where the text information extracted from the second image data includes at least one of the one or more character strings in the second character string list.

2. The image processing apparatus according to claim 1, wherein the image processing apparatus has a setting for switching enabling and disabling of a censorship mode, and wherein in a case where the censorship mode is enabled by the setting, the one or more processors and the one or more memories are configured to perform the comparison process for comparing the text information extracted from the first image data and the one or more character strings in the first character string list and the comparison process for comparing the text information extracted from the second image data and the one or more character strings in the second character string list.

3. The image processing apparatus according to claim 1, further comprising:

an interface configured to receive the print job including the first image data from an external apparatus.

4. The image processing apparatus according to claim 1, further comprising a printer configured to print the image on the sheet, the printer being used in the print function.

5. The image processing apparatus according to claim 1, further comprising a network interface configured to transmit the second image data, the network interface being used in the transmission function.

6. The image processing apparatus according to claim 1, wherein the first and second character string lists are registered by an administrator who manages the image processing apparatus, and wherein the first and second character string lists are registered in a state that a predetermined screen is displayed.

7. The image processing apparatus according to claim 1, wherein the one or more processors and the one or more memories are further configured to:

print the image of the first image data using the print function in a case where the text information extracted from the first image data does not include the one or more character strings in the first character string list; and transmit the second image data using the transmission function in a case where the text information extracted from the second image data does not include the one or more character strings in the second character string list.

8. The image processing apparatus according to claim 1, further comprising:

a display, wherein the one or more processors and the one or more memories are further configured to display a screen on the display, and wherein in a case where the one or more processors and the one or more memories prohibit to print or transmit, the one or more processors and the one or more memories display on the display a screen indicating that a job cannot be executed.

9. A control method for controlling an image processing apparatus having a print function for printing an image of image data on a sheet and a transmission function for transmitting image data generated by scanning a document, the control method comprising:

registering a plurality of character string lists including a first character string list composed of respective one or more character strings and a second character string list composed of respective one or more character strings and different in at least one character string from the first character string list;

receiving a job;

determining that the received job is a print job or a transmission job;

performing, in a case where it is determined that the received job is the print job a comparison process for comparing text information extracted from first image data instructed, in the print job, to be printed by the print function and the one or more character strings in the first character string list;

prohibiting to print an image of the first image data using the print function in a case where the text information extracted from the first image data includes at least one of the one or more character strings in the first character string list;

performing, in a case where it is determined that the received job is the transmission job, a comparison process for comparing text information extracted from second image data instructed, in the transmission job, to be transmitted by the transmission function and the one or more character strings in the second character string list;

prohibiting to transmit the second image data using the transmission function in a case where the text information extracted from the second image data includes at least one of the one or more character strings in the second character string list.

* * * * *